US012601669B2

(12) United States Patent
Gao et al.

(10) Patent No.: US 12,601,669 B2
(45) Date of Patent: Apr. 14, 2026

(54) METHOD FOR MEASURING LIQUID FLOW PROPERTY AND APPARATUS FOR OBSERVING DROPLET

(71) Applicant: CCTEG Coal Mining Research Institute, Beijing (CN)

(72) Inventors: Fuqiang Gao, Beijing (CN); Jinhong Yang, Beijing (CN); Shuwen Cao, Beijing (CN); Jinfu Lou, Beijing (CN); Rui Wu, Beijing (CN); Lei Yang, Beijing (CN); Xiaoqing Wang, Beijing (CN); Jianzhong Li, Beijing (CN); Shuangyong Dong, Beijing (CN); Wenju Liu, Beijing (CN); Guiyang Yuan, Beijing (CN)

(73) Assignee: CCTEG Coal Mining Research Institute, Beijing (CN)

( * ) Notice: Subject to any disclaimer, the term of this patent is extended or adjusted under 35 U.S.C. 154(b) by 304 days.

(21) Appl. No.: 18/685,105

(22) PCT Filed: Oct. 19, 2023

(86) PCT No.: PCT/CN2023/125460
§ 371 (c)(1),
(2) Date: Feb. 20, 2024

(87) PCT Pub. No.: WO2025/060164
PCT Pub. Date: Mar. 27, 2025

(65) Prior Publication Data
US 2025/0231095 A1 Jul. 17, 2025

(30) Foreign Application Priority Data
Sep. 22, 2023 (CN) .......................... 202311235916.0

(51) Int. Cl.
*G01N 11/00* (2006.01)

(52) U.S. Cl.
CPC .................................... *G01N 11/00* (2013.01)

(58) Field of Classification Search
None
See application file for complete search history.

(56) References Cited

U.S. PATENT DOCUMENTS

| | | | | |
|---|---|---|---|---|
| 3,483,732 A | * | 12/1969 | Gogarty | ................... G01N 9/26 73/32 A |
| 6,589,792 B1 | * | 7/2003 | Malachowski | .... G01N 15/1427 209/127.4 |
| 10,238,992 B2 | * | 3/2019 | Oshinowo | .............. B01D 17/12 |

FOREIGN PATENT DOCUMENTS

CN 110932878 A 3/2020

* cited by examiner

*Primary Examiner* — Suman K Nath
(74) *Attorney, Agent, or Firm* — Maginot, Moore & Beck, LLP

(57) ABSTRACT

A method for measuring a liquid flow property is provided. The method includes controlling a droplet to drop from a preset height to a substrate, acquiring a droplet density on the substrate, a maximum radius of a tip of the droplet, a real-time height of the tip, an initial height of the tip, and a testing duration from a beginning of the droplet to fall on the substrate to an end of a test, determining that influencing factors of the tip of the droplet comprise inertial force and viscous force, and the inertial force is equal to the viscous force, and calculating a calculated viscosity of the droplet, wherein the calculated viscosity of the droplet is related to a first calculation coefficient, the droplet density, the maximum radius of the tip and the initial height of the tip, and the first calculation coefficient is equal to a ratio of a tip height change value to the testing duration, wherein the tip height change value is a difference between the initial height of the tip and the real-time height of the tip.

10 Claims, 5 Drawing Sheets

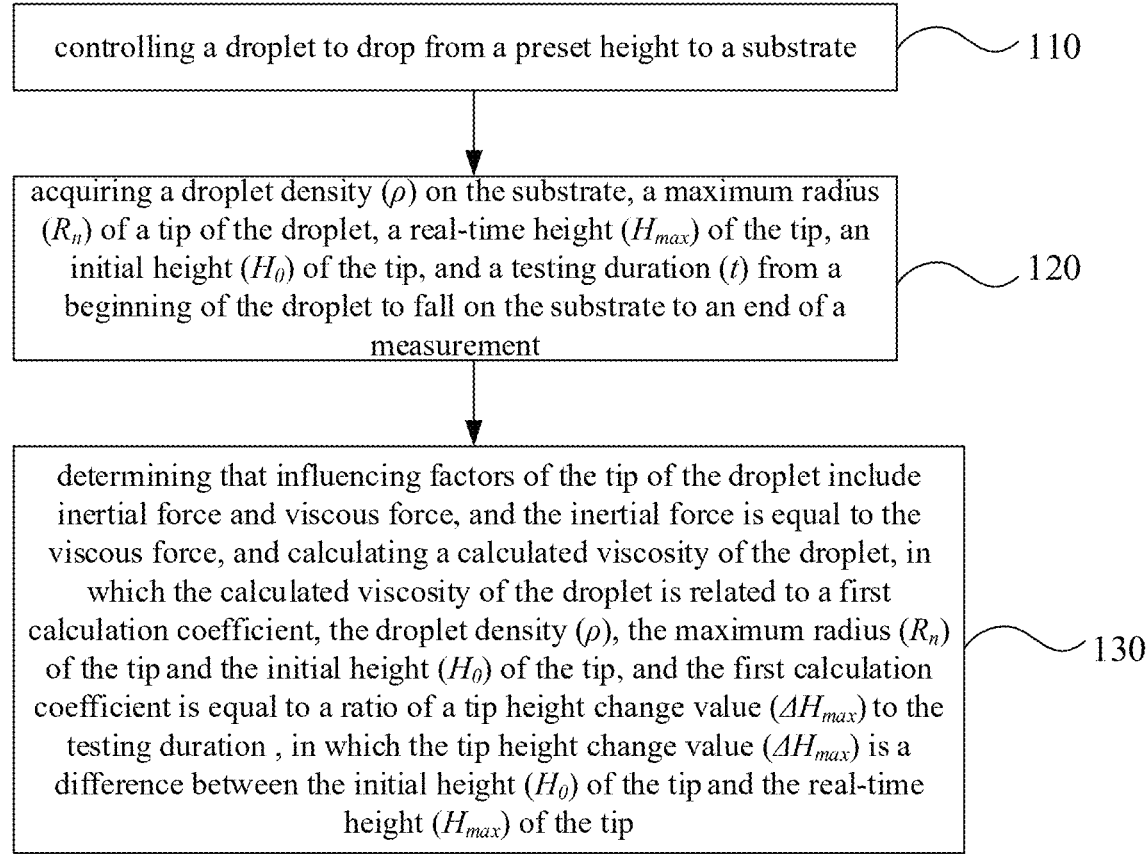

controlling a droplet to drop from a preset height to a substrate 〜110 acquiring a droplet density ($\rho$) on the substrate, a maximum radius ($R_n$) of a tip of the droplet, a real-time height ($H_{max}$) of the tip, an initial height ($H_0$) of the tip, and a testing duration ($t$) from a beginning of the droplet to fall on the substrate to an end of a measurement 〜120 determining that influencing factors of the tip of the droplet include inertial force and viscous force, and the inertial force is equal to the viscous force, and calculating a calculated viscosity of the droplet, in which the calculated viscosity of the droplet is related to a first calculation coefficient, the droplet density ($\rho$), the maximum radius ($R_n$) of the tip and the initial height ($H_0$) of the tip, and the first calculation coefficient is equal to a ratio of a tip height change value ($\Delta H_{max}$) to the testing duration , in which the tip height change value ($\Delta H_{max}$) is a difference between the initial height ($H_0$) of the tip and the real-time height ($H_{max}$) of the tip 〜130

FIG. 1

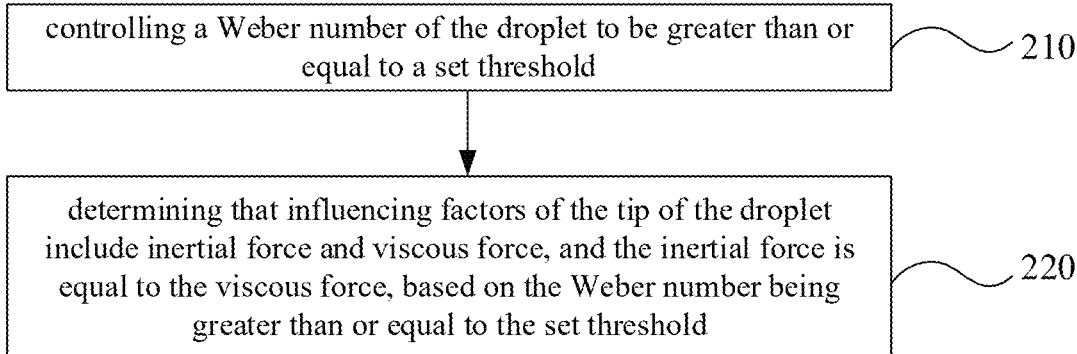

controlling a Weber number of the droplet to be greater than or equal to a set threshold 〜210 determining that influencing factors of the tip of the droplet include inertial force and viscous force, and the inertial force is equal to the viscous force, based on the Weber number being greater than or equal to the set threshold 〜220

FIG. 2

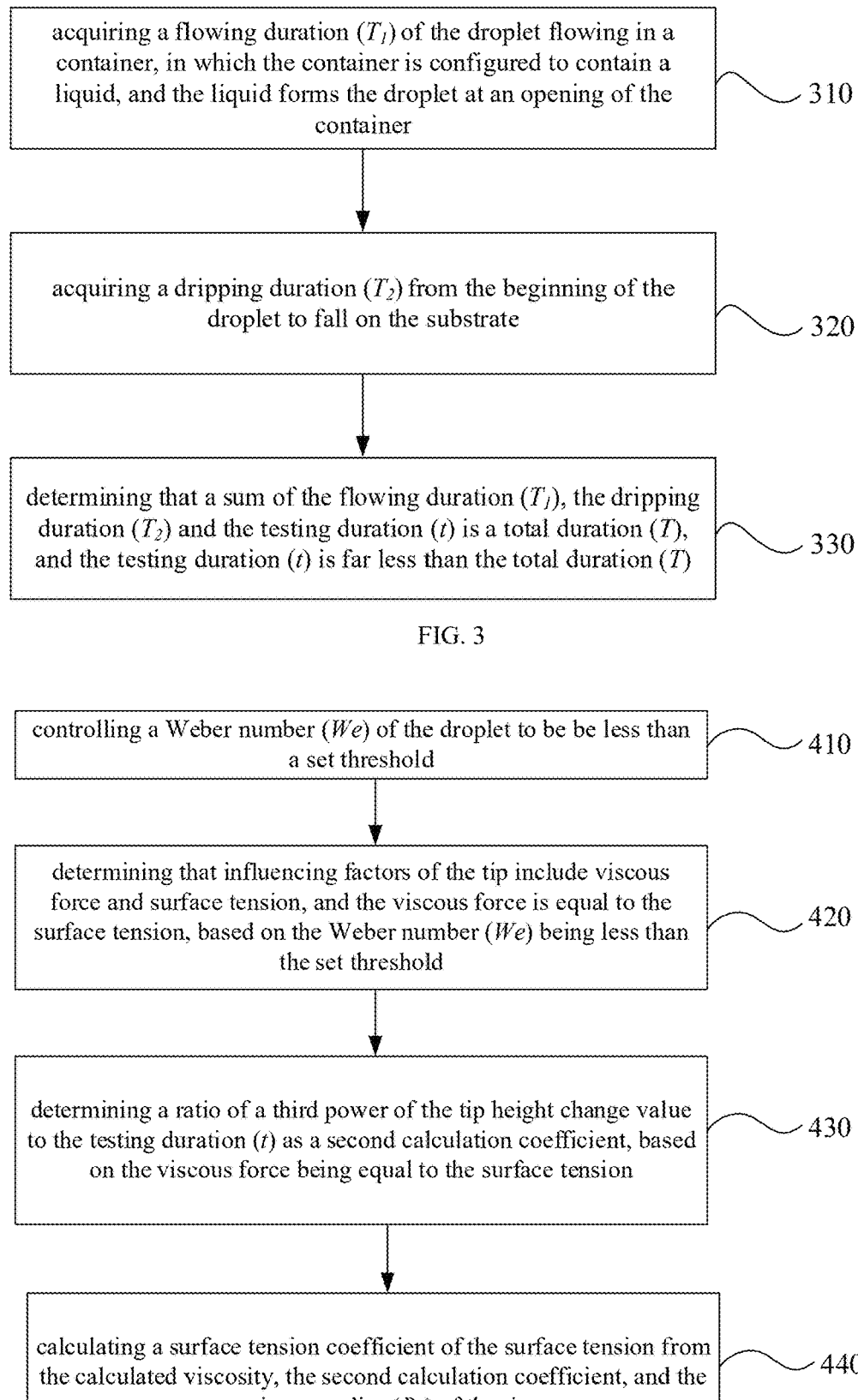

acquiring a flowing duration ($T_1$) of the droplet flowing in a container, in which the container is configured to contain a liquid, and the liquid forms the droplet at an opening of the container          310 acquiring a dripping duration ($T_2$) from the beginning of the droplet to fall on the substrate          320 determining that a sum of the flowing duration ($T_1$), the dripping duration ($T_2$) and the testing duration ($t$) is a total duration ($T$), and the testing duration ($t$) is far less than the total duration ($T$)          330

FIG. 3 controlling a Weber number ($We$) of the droplet to be be less than a set threshold          410 determining that influencing factors of the tip include viscous force and surface tension, and the viscous force is equal to the surface tension, based on the Weber number ($We$) being less than the set threshold          420 determining a ratio of a third power of the tip height change value to the testing duration ($t$) as a second calculation coefficient, based on the viscous force being equal to the surface tension          430 calculating a surface tension coefficient of the surface tension from the calculated viscosity, the second calculation coefficient, and the maximum radius ($R_n$) of the tip          440

FIG. 4 a $$\Delta H_{max} - H_0 = C_1 H_0 t$$

b $$\Delta H_{max}^3 = C_2 t$$

METHOD FOR MEASURING LIQUID FLOW PROPERTY AND APPARATUS FOR OBSERVING DROPLET

CROSS-REFERENCE TO RELATED APPLICATIONS

This application a national phase entry under 35 USC § 371 of International Application PCT/CN2023/125460, filed on Oct. 19, 2023, which claims priority to and the benefits of Chinese Patent Application No. 202311235916.0, filed on Sep. 22, 2023, the entire content of which is incorporated herein by reference.

FIELD

The present disclosure relates to the technical field of a flow property measurement, and more particularly to a method for measuring a liquid flow property, and an apparatus for observing a droplet.

BACKGROUND

Reaction liquids, such as resins, binders, and certain chemical products, etc., undergo a chemical reaction process of curing under specific conditions. Physical and chemical properties of such reaction liquids, especially viscosity and surface tension, change significantly with time during curing. The surface tension and viscosity are important physical and chemical properties of a liquid. The viscosity is a measure of friction between molecules inside a liquid, and the surface tension is a measure of interaction between a liquid and its adjacent interfaces. For many industrial applications, such as coatings, adhesives, encapsulation, and composite materials, etc., it is very important to know and accurately measure variations in these parameters.

In related technologies, measurement methods of viscosity and surface tension are often discrete measurements of fluid samples at fixed time points. Such methods have limitations. For example, variations in parameters at certain critical moments may be missed, it needs a lot of liquid samples and experimental time, or it is difficult to capture the continuity of dynamic changes of the reaction liquids.

SUMMARY

A method for measuring a liquid flow property according to a first aspect of embodiments of the present disclosure includes controlling a droplet to drop from a preset height to a substrate, acquiring a droplet density on the substrate, a maximum radius of a tip of the droplet, a real-time height of the tip, an initial height of the tip, and a testing duration from a beginning of the droplet to fall on the substrate to an end of a test, determining that influencing factors of the tip of the droplet include inertial force and viscous force, and the inertial force is equal to the viscous force, and calculating a calculated viscosity of the droplet. The calculated viscosity of the droplet is related to a first calculation coefficient, the droplet density, the maximum radius of the tip and the initial height of the tip, and the first calculation coefficient is equal to a ratio of a tip height change value to the testing duration. The tip height change value is a difference between the initial height of the tip and the real-time height of the tip.

An apparatus for observing a droplet according to a second aspect of embodiments of the present disclosure includes a droplet injection component configured to generate the droplet, and including a first light source emitter, in which a dripping direction of the droplet is the same as a light emitting direction of first light emitted by the first light source emitter, a supporting component, one end of which being connected with the droplet injection component, and the other end of which being connected with a stage, in which the stage is configured to support a light spot sensor, and an acquisition component configured to acquire an image of the droplet dripping on the light spot sensor, in which the acquisition component is communicatively connected with the light spot sensor. The acquisition component is controlled to move to an acquisition position matching a position signal, based on the position signal of the first light received by the light spot sensor.

In addition to the technical problems solved by the present disclosure, the technical features constituting the technical solution, and the advantages brought by the technical solution with these technical features as described above, other technical features of the present disclosure and the advantages brought by these technical features will be further explained in conjunction with the accompanying drawings.

BRIEF DESCRIPTION OF THE DRAWINGS

In order to illustrate the technical solutions in the present disclosure or the prior art more clearly, accompanying drawings needed to be used in the description of the embodiments or the prior art will be briefly introduced below. It is apparent that the accompanying drawings in the following description are some embodiments of the present disclosure. For those ordinarily skilled in the art, other accompanying drawings may also be obtained from these accompanying drawings without creative labor.

FIG. 1 is a flow chart of a method for measuring a liquid flow property provided in an embodiment of the present disclosure.

FIG. 2 is a flow chart for determining a calculated viscosity of a droplet based on a Weber number to be greater than or equal to a set threshold provided in an embodiment of the present disclosure.

FIG. 3 is a flow chart for determining a total duration T provided in an embodiment of the present disclosure.

FIG. 4 is a flow chart for determining a surface tension coefficient of a droplet based on a Weber number to be greater than or equal to a set threshold provided in an embodiment of the present disclosure.

REFERENCE NUMERALS

Figure 5:
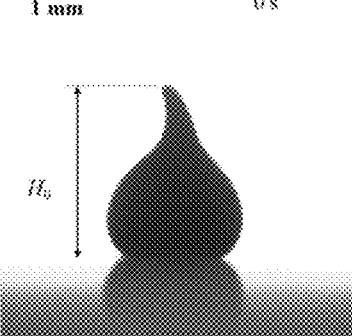
FIG. 5 is a schematic diagram of a droplet just dripping on a substrate provided in an embodiment of the present disclosure.
Figure 6:
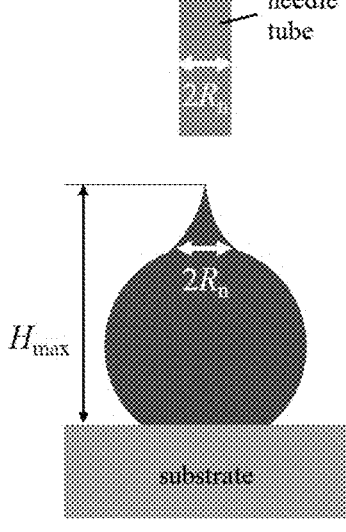
FIG. 6 is a schematic diagram of a liquid dripping from an outlet of a needle tube onto a substrate provided in an embodiment of the present disclosure.
Figure 7:
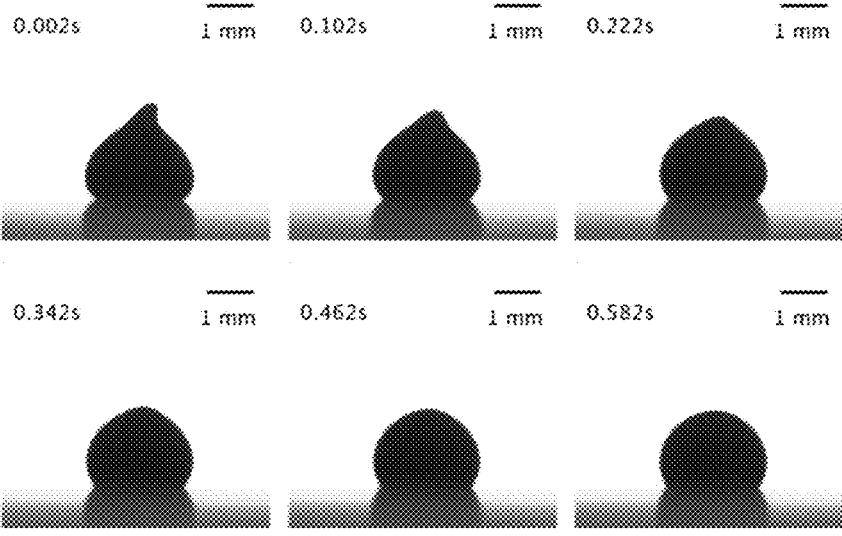
FIG. 7 is a schematic diagram of a droplet just dripping on a substrate until the droplet becomes a spherical crown provided in an embodiment of the present disclosure.

Droplet injection component 100; first light source emitter 110; droplet nozzle 120; liquid intake portion 121;

liquid intake channel 1211; liquid inlet 1212; injection portion 122; injection channel 1221; injection port 1222; liquid adding assembly 130; outlet 131; liquid adding cavity 132; stirring rod 140; guide groove 141; injection pump 151; injection pump controller 152; bolt 160; push rod 170;

Supporting component 200; stage 210; light spot sensor 220; adjustment column 221;

Acquisition component 300; high-speed camera 310; zoom lens 311; third light source emitter 320; three-axis displacement table 330;

Blocking component 400; liquid bearing tray 410; rotating console 420; output shaft 430; cantilever 440;

Trigger component 500; second light source emitter 510; light intensity receptor 520;

Mobile platform 600; box 700.

DETAILED DESCRIPTION

In order to make the purpose, technical solution and advantages of the present disclosure more clear, the technical solution in the present disclosure will be described clearly and completely in combination with the accompanying drawings in the present disclosure below. Obviously, embodiments described are part of the embodiments of the present disclosure, not all embodiments. Based on the embodiments in the present disclosure, all other embodiments obtained by those ordinarily skilled in the art without creative labor belong to the scope of the protection of the present disclosure.

In the description of the embodiment of the present disclosure, it is to be noted that, the orientation or positional relationship indicated by terms such as "central," "longitudinal," "lateral," "upper," "lower," "front," "rear," "left," "right," "vertical," "horizontal," "top," "bottom," "inner," and "outer" is based on the orientation or positional relationship shown in the accompanying drawings, which is only for the convenience of describing the present disclosure rather than requiring the present disclosure being constructed and operated in a particular orientation, so it cannot be construed as a limitation of the present disclosure. In addition, the terms "first," "second" and "third" are merely used for descriptive purposes, and cannot be understood as indicating or implying relative importance.

In the description of the embodiment of the present disclosure, it is to be noted that, unless specified or limited otherwise, terms "interconnected," and "connected" are used broadly, and may be, for example, fixed connections, detachable connections, or integral connections, may also be mechanical or electrical connections, may also be direct connections or indirect connections via an intermediary. Specific meanings of the above-mentioned terms in the embodiment of the present disclosure may be understood by those skilled in the art according to specific situations.

In the embodiment of the present disclosure, unless specified or limited otherwise, a first feature is "on" or "below" a second feature may be that the first feature is in direct contact with the second feature, or the first feature and the second feature are in indirect contact through an intermediary. Furthermore, a first feature "on," "above," or "on top of" a second feature may be that the first feature is right or obliquely "on," "above," or "on top of" the second feature, or just means that the first feature is at a height higher than that of the second feature. A first feature "below," "under," or "on bottom of" a second feature may be that the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," mean that a particular feature, structure, material, or characteristic described in connection with the embodiment or example is included in at least one embodiment or example of the present disclosure. The schematic expressions of the above-mentioned terms throughout this specification are not necessarily referring to the same embodiment or example. Moreover, the particular features, structures, materials, or characteristics described may be combined in any suitable manner in one or more embodiments or examples. In addition, those skilled in the art can combine the different embodiments or examples and features of different embodiments or examples described in this specification without being mutually inconsistent.

The present disclosure aims to solve at least one of the technical problems existing in related technologies. Therefore, the present disclosure provides a method for measuring a liquid flow property, which is used to solve the defect that a liquid flow property measurement in the prior art is difficult to continuously and accurately measure variations in viscosity and surface tension of a liquid in a whole curing process.

A method for measuring a liquid flow property according to an embodiment of the present disclosure is described below in conjunction with FIGS. 1 to 9.

Combined with FIG. 1, an embodiment of the present disclosure provides a method for measuring a liquid flow property. The method includes steps 110 to 130.

In step 110, a droplet is controlled to drop from a preset height to a substrate.

When the droplet falls freely from the preset height under the action of gravity and surface tension, the droplet may be dragged out of a tip, as shown in FIG. 5. When the droplet drips on the substrate. That is, after the droplet hits the substrate, the tip gradually retracts over time until the droplet becomes a spherical crown (see FIG. 7). In this process, the retraction of the tip is affected by four forces, namely, inertial force, viscous force, surface tension, and gravity.

A ratio of gravity to surface tension on the tip of the droplet may be expressed by a Bond number (Bo). That is, $$B_0 = \frac{\rho g R_n^2}{\gamma},$$

where $\rho$ is a droplet density, g is the gravitational acceleration, $R_n$ is a maximum radius of the tip of the droplet, and $\gamma$ is surface tension of the droplet. In an embodiment of the present disclosure, $\rho$ is substantially 1000 kg/m$^3$, g is substantially 10 m/s$^2$, $R_n$ is substantially 10$^{-4}$ m, and $\gamma$ is substantially 10$^{-2}$ N/m. Therefore, Bo is substantially 0.01. That is, the influence of gravity on the tip is far less than the surface tension. It is to be said that "substantially" means approximately or substantially equal, may be equal, or may also be close.

Therefore, in the embodiment of the present disclosure, there is no need to consider the influence of gravity on the retraction of the tip.

In step 120, a droplet density ($\rho$) on the substrate, a maximum radius ($R_n$) of a tip of the droplet, a real-time height ($H_{max}$) of the tip, an initial height ($H_0$) of the tip, and a testing duration (t) from a beginning of the droplet to fall on the substrate to an end of a test are acquired.

In step 130, it is determined that influencing factors of the tip of the droplet include inertial force and viscous force, and the inertial force is equal to the viscous force, and a calculated viscosity ($\eta$) of the droplet is calculated. The calculated viscosity ($\eta$) of the droplet is related to a first calculation coefficient ($C_1$), the droplet density ($\rho$), the maximum radius ($R_n$) of the tip and the initial height ($H_0$) of the tip, and the first calculation coefficient ($C_1$) is equal to a ratio of a tip height change value ($\Delta H_{max}$) to the testing duration (t). The tip height change value ($\Delta H_{max}$) is a difference between the initial height ($H_0$) of the tip and the real-time height ($H_{max}$) of the tip.

The calculated viscosity $$\eta = C_1 \frac{\rho R_n^2}{H_0}.$$

In an embodiment of the present disclosure, the first calculation coefficient ($C_1$) is introduced, and the first calculation coefficient $$C_1 = \frac{\Delta H_{max}}{t}.$$

In the present disclosure, a change of a height of the tip of the droplet with time is recorded after the droplet hits the substrate, thus $C_1$ is obtained. The time of a single measurement may be less than 0.5 s, and a change of a viscosity of the droplet with time may be measured quickly. Then, the calculated viscosity ($\eta$) is calculated.

In the method for measuring the liquid flow property provided in the present disclosure, the calculated viscosity of the droplet is determined based on the first calculation coefficient, the droplet density, the maximum radius of the tip and the initial height of the tip. The first calculation coefficient is the ratio of the tip height change value to the testing duration. The tip height of the droplet may change with the testing duration. The present disclosure is capable of measuring the calculated viscosity of the droplet according to the change of the height of the tip of the droplet with time, which is obviously different from the existing titration method, rotation method, vibration method and pipeline method. The method for measuring the liquid flow property may monitor a change of the droplet in real time, so that a dynamic change of a droplet flow property may be captured.

It may be understood that, combined with FIG. 2, before step 130, that is, before the step of calculating the calculated viscosity ($\eta$) of the droplet, steps 210 and 220 are also included.

In step 210, a Weber number ($W_e$) of the droplet is controlled to be greater than or equal to a set threshold.

The Weber number is used to compare the influence of inertial force and surface tension. A calculation formula of the Weber number is:

$$W_e = \frac{\rho v_0^2}{\gamma} \left( \frac{3 V_0}{4\pi} \right)^{\frac{1}{3}}$$

where $W_e$ is the Weber number,
$\rho$ is the droplet density, $v_0$ is a dripping speed of the droplet when it just drips on the substrate, $V_0$ is a droplet volume, $\gamma$ is the surface tension coefficient, which represents the surface tension on the straight line segment of the unit length on the liquid surface, The dripping speed $v_0$ and the droplet volume $V_0$ when the droplet just drips on the substrate are acquired, and a numerical range of the Weber number is adjusted by controlling the dripping speed $v_0$ and the droplet volume $V_0$. The Weber number may be adjusted in the range from 1 to 500.

In step 220, it is determined that influencing factors of the tip of the droplet include inertial force and viscous force, and the inertial force is equal to the viscous force, based on the Weber number ($W_e$) being greater than or equal to the set threshold.

In an embodiment of the present disclosure, let the set threshold is 100, when the Weber number is greater than or equal to 100, the tip of the droplet is dominated by both the inertial force and the viscous force, and the two are balanced, that is, the inertial force is equal to the viscous force:

$$\rho \frac{\partial^2 H_{max}}{\partial t^2} R_n^2 H_{max} = \eta \frac{\partial H_{max}}{R_n \partial t} R_n H_{max} \tag{1}$$

where $\rho$ is the droplet density,
$\eta$ is the calculated viscosity,
$R_n$ is the maximum radius of the tip,
t is the testing duration from the beginning of the droplet to fall on the substrate to the end of the test, when t=0, the droplet just drips on the substrate, that is, the droplet hits the substrate,
$H_{max}$ is the real-time height of the tip, which varies with the testing duration t.

It is to be noted that, $$\frac{\partial^2 H_{max}}{\partial t^2}$$

represents a second order partial derivative operation of $H_{max}$ with respect to t, and $$\frac{\partial H_{max}}{\partial t}$$

represents a first order partial derivative operation of $H_{max}$ with respect to t.

A Formula:

$$\frac{\Delta H_{max}}{H_0} = \frac{\eta t}{\rho R_n^2} \tag{2}$$

is obtained by solving the formula (1), $$\eta = C_1 \frac{\rho R_n^2}{H_0}$$

is obtained by the formula (2),

7

8 where $\Delta H_{max}$ is the tip height change value, and $\Delta H_{max} = H_0 - H_{max}$, H$_0$ is the initial height of the tip when the droplet drips on the substrate, C$_1$ is the first calculation coefficient, where $$C_1 = \frac{\Delta H_{max}}{t}.$$

With regard to the Weber number greater than or equal to 100, it is to be noted that, in some embodiments, the preset height is greater than or equal to 11.8 cm, and the maximum radius (R$_n$) of the tip is between 0.5 mm to 1 mm. The preset height may affect the dripping speed v$_0$ of the droplet when it just drips on the substrate, that is, the preset height may affect a speed of the droplet when it hits the substrate. In the embodiment, the preset height is greater than or equal to 11.8 cm, and the maximum radius (R$_n$) of the tip is between 0.5 mm to 1 mm, so that a requirement of We>100 may be guaranteed. It is determined that the influencing factors of the force acting on the tip of the droplet include the inertial force and the viscous force, thus avoiding the influence of surface tension when measuring the viscosity of the droplet.

It is to be noted that, combined with FIG. 3, in step 110, that is, in the step of controlling the droplet to drop from the preset height to the substrate, steps 310 to 330 are also included.

In step 310, a flowing duration T$_1$ of the droplet flowing in a container is acquired. The container is configured to contain a liquid, and the liquid forms the droplet at an opening of the container.

The container may be a needle tube, and the liquid may enter the needle tube from an inlet of the needle tube and flow in the needle tube. The liquid flows to an outlet of the needle tube, and the droplet drips from the outlet when subjected to gravity and surface tension. It may be understood that a duration taken for the liquid to flow from the inlet to the outlet of the needle tube is the flowing duration T$_1$. Combined with FIG. 6, the maximum radius (R$_n$) of the tip is equal to a radius at the outlet of the needle tube. That is, the maximum radius (R$_n$) of the tip depends on the radius of the outlet of the needle tube. Of course, the container is not limited to the needle tube, but may also be a test tube, and other customized containers. By adjusting a radius at an outlet of the container, the maximum radius (R$_n$) of the tip may be adjusted.

In related technologies, taking a rotation method for measuring a droplet flow property as an example, a droplet to be measured needs to be placed on a measuring device and rotate it until the droplet solidifies, which may lead to the difficulty in cleaning solidified droplet, thus leading to the failure of the measuring device.

In the embodiment of the present disclosure, it may be understood that when the liquid is in the container, the droplet is in a dripping process, and the droplet is in a measuring process, the droplet is not completely solidified. In other words, the droplet is not completely solidified during a whole measuring process. The droplet may be in a flowing state to a completely solidified state. The droplet in the embodiment of the present disclosure is in an incomplete solidified state during the whole measurement process, so that a problem that the measuring device fails due to the solidification of the droplet may be avoided.

In step 320, a dripping duration T$_2$ from the beginning of the droplet to fall on the substrate is acquired.

In an embodiment of the present disclosure, the dripping duration T$_2$ may be controlled by controlling the preset height. That is, a reaction duration (dripping duration T$_2$) when the droplet reaches the substrate may be controlled by controlling a falling height of the droplet. It may be understood that, taking the needle tube to contain the liquid and the liquid being synthesized by various substances as an example, for example, the liquid is used as a binder, the binder needs various additives to meet requirements of different applications, and the various substances may be mixed in the needle tube to synthesize the liquid. Therefore, it may be understood that the liquid is synthesized in the needle tube. Compared with related technologies, synthesized liquid needs to be allowed to stand, pumped and finally measured in sequence. In the embodiment of the present disclosure, the integration of liquid synthesis, transportation and measurement may be realized, which not only may save time effectively, but also may realize a next step (transportation) by controlling the falling height of the droplet after synthesis without waiting for standing, or pumping, and realize measurement, thus improving the efficiency of experimental. A process in which the droplet beginning to drip to the substrate is transportation.

In step 330, it is determined that a sum of the flowing duration T$_1$, the dripping duration T$_2$ and the testing duration is a total duration T, and the testing duration t is far less than the total duration T.

In an embodiment of the present disclosure, the total duration $T = T_1 + T_2 + t$. The testing duration t may be understood as a time after the droplet hits the substrate, and the total duration T may be understood as a reaction duration of the droplet. Regarding the reaction duration, it is to be noted that, a resin or a binder is taken as an example of the droplet, and the resin and the binder are usually liquid or semi-solid materials, which need a certain time to harden, cure or bond, and the reaction duration of the droplet may be understood as a time required for the droplet to cure or harden.

A viscosity of the liquid on the substrate is a function of T, that is, $\eta = f(T)$. In an embodiment of the present disclosure, the testing duration t is far less than the total duration T, that is, $t \ll T$, such as, t=0.01 s, T=0.5 s: t=0.02 s, T=0.4 s. In the embodiment of the present disclosure, since $t \ll T$, a change of the viscosity of the droplet in time t may be ignored. Since t is small enough, a change of the viscosity when the droplet itself drips due to the blocking of the droplet by the substrate in a measurement process may be ignored, so that the viscosity of the droplet after the total duration T may be characterized by the tip height change value $\Delta H_{max}$ of the droplet on the substrate and the testing duration t, that is:

$$\eta = f_1(T) = f_1(t) = C_1 \frac{\rho R_n^2}{H_0} = \frac{\Delta H_{max}}{t} \times \frac{\rho R_n^2}{H_0}$$

It may be seen that, in the method for measuring the liquid flow property provided in the embodiment of the present disclosure, the change of the droplet flow property (such as, the viscosity and the surface tension) after different reaction durations may be measured by controlling the total duration (reaction duration) T. Since the testing duration t is far less than the total duration T, not only the influence caused by the change of the viscosity of the droplet within the testing duration t may be avoided, but also the change of the viscosity of the droplet within the testing duration may be ignored. The droplet flow property of the total duration T may be calculated through the testing duration. Since the testing duration is small enough, it may effectively reduce a time required for measurement, and realize a rapid detection of the droplet flow property.

The determination of the viscosity of the droplet is illustrated above, and the determination of the surface tension coefficient of the droplet is illustrated below.

Combined with FIG. 4, in an embodiment of the present disclosure, a method for measuring a liquid flow property further includes steps 410 to 440.

In step 410, a Weber number ($W_e$) of the droplet is controlled to be less than a set threshold.

In step 420, it is determined that influencing factors of the tip include viscous force and surface tension, and the viscous force is equal to the surface tension, based on the Weber number ($W_e$) being less than the set threshold.

In step 430, after the step of calculating the calculated viscosity ($\eta$) of the droplet, a ratio of a third power of the tip height change value ($\Delta H_{max}$) to the testing duration (t) is determined as a second calculation coefficient ($C_2$), based on the viscous force being equal to the surface tension.

In step 440, a surface tension coefficient of the surface tension is calculated from the calculated viscosity ($\eta$), the second calculation coefficient ($C_2$), and the maximum radius ($R_n$) of the tip.

In an embodiment of the present disclosure, let the set threshold is 100, when the Weber number is less than 100, the tip of the droplet is dominated by both the surface tension and the viscous force, and the two are balanced, that is, the surface tension is equal to the viscous force:

$$\left(\frac{\Delta H_{max}}{R_n}\right)\eta\frac{\Delta H_{max}}{t}\Delta H_{max} = \gamma R_n \qquad (3)$$

where $\Delta H_{max}$ is the tip height change value, and $\Delta H_{max}=H_0-H_{max}$, $H_0$ is the initial height of the tip when the droplet drips on the substrate, $H_{max}$ is the real-time height of the tip, which varies with the testing duration t, $R_n$ is the maximum radius of the tip, $\eta$ is the calculated viscosity, t is the testing duration from the beginning of the droplet to fall on the substrate to the end of the test, the surface tension is $F=\gamma R_n$, $\gamma$ is the surface tension coefficient, which represents surface tension on a straight line segment of a unit length on a liquid surface.

A Formula:

$$\Delta H_{max} = \sqrt[3]{\frac{\gamma R_n^2 t}{\eta}} \qquad (4)$$

is obtained by solving the formula (3).

$$\gamma = \frac{\eta C_2}{R_n^2} \qquad (5)$$

is obtained by the formula (4),
where $C_2$ is the second calculation coefficient, where $$C_2 = \frac{\Delta H_{max}^3}{t}.$$

In the embodiment of the present disclosure, the second calculation coefficient ($C_2$) is introduced, and the second calculation coefficient $$C_2 = \frac{\Delta H_{max}^3}{t}.$$

In the embodiment of the present disclosure, based on $W_e>100$, at this time, the force acting on the tip of the droplet is dominated by the inertial force and the viscous force. Thus, under the condition of avoiding the influence of surface tension on the tip of the droplet, $C_1$ may be obtained by measuring the change of the height of the tip of the droplet with time after the droplet hits the substrate. Then, the calculated viscosity ($\eta$) is calculated. Further, controlling $W_e<100$, at this time, the force acting on the tip of the droplet is dominated by the viscous force and the surface tension. $C_2$ may be obtained by measuring the change of the height of the tip of the droplet with time after the droplet hits the substrate. Finally, the calculated viscosity ($\eta$) is substituted into formula (5) to obtain the surface tension coefficient ($\gamma$).

In the method for measuring the liquid flow property provided in the embodiment of the present disclosure, the first calculation coefficient ($C_1$) and the second calculation coefficient ($C_2$) are determined according to the change of the height of the tip of the droplet with time. Then, the calculated viscosity ($\eta$) and the surface tension coefficient ($\gamma$) are determined. Therefore, not only the change of the droplet may be monitored in real time and the dynamic change of the droplet flow property may be captured, but also the change of the viscosity and the surface tension of the droplet in a whole curing process may be accurately measured.

At the same time, in the embodiment of the present disclosure, the viscosity and the surface tension of the droplet with time may be measured by using a same set of device, which makes data calculation and analysis more convenient, and does not need to use different devices to measure different parameters, which may save time and resources and ensure the consistency of the test.

It is to be noted that the surface tension coefficient ($\gamma$) may be obtained by substituting the calculated viscosity ($\eta$) into the formula (5). Assuming that a total duration for measuring the calculated viscosity ($\eta$) is $T_\eta$, and a total duration for measuring the surface tension coefficient ($\gamma$) is $T\gamma$, it is necessary to ensure that $T_\eta=T_\gamma$ before substituting the calculated viscosity ($\eta$) into the formula (5) to obtain the surface tension coefficient ($\gamma$).

Combined with FIG. 8, the first calculation coefficient ($C_1$) will be described.

In step 130, that is, in the step of determining the ratio of the tip height change value ($\Delta H_{max}$) to the testing duration (t) as the first calculation coefficient ($C_1$), the initial height ($H_0$) of the tip and a plurality of the real-time heights ($H_{max}$) of the tip within the testing duration (t) are acquired, and a linear relationship between the first calculation coefficient ($C_1$), the testing duration (t) and a height difference ($\Delta H_{max}$) of the tip is obtained by fitting.

After the droplet hits the substrate, the real-time height ($H_{max}$) of the tip varies with the testing duration. Through a plurality of tip height change values ($\Delta H_{max}$) and their corresponding testing duration (t), a slope ($C_1$) is obtained by linear fitting experimental data. The slope ($C_1$) is the first calculation coefficient, thus quantifying the experimental data and providing a numerical parameter (slope ($C_1$)) to provide a reliable basis for a subsequent calculation of the calculated viscosity ($\eta$).

Figure 9:
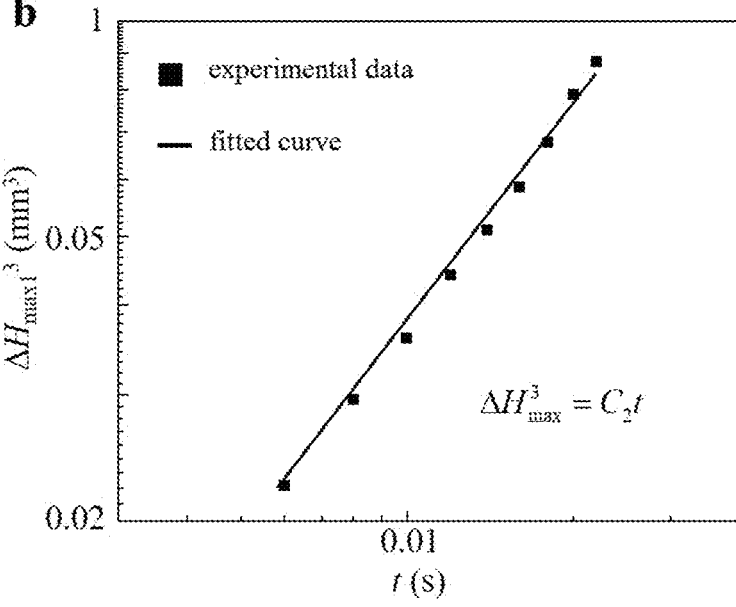
FIG. 9 is a schematic diagram of obtaining a second calculation coefficient by linear fitting experimental data provided in an embodiment of the present disclosure.

Similarly, combined with FIG. 9, in the step of determining the ratio of the third power of the tip height change value ($\Delta H_{max}$) to the testing duration (t) as the second calculation coefficient ($C_2$), the initial height ($H_0$) of the tip and a plurality of the real-time heights ($H_{max}$) of the tip within the testing duration (t) are acquired, and a linear relationship between the second calculation coefficient ($C_2$), the testing duration (t) and a height difference ($\Delta H_{max}$) of the tip is obtained by fitting. A slope ($C_2$) is obtained by linear fitting experimental data. The slope ($C_2$) is the second calculation coefficient, thus quantifying the experimental data and providing a numerical parameter (slope ($C_2$)) to provide a reliable basis for a subsequent calculation of the surface tension coefficient ($\gamma$).

Measurement outflow of the method for measuring the liquid flow property provided in an embodiment of the present disclosure will be described below.

(1) In order to obtain the calculated viscosity ($\eta$) of the liquid after a duration of T, it is necessary to calculate a time T1 for the droplet to flow in the needle tube (a flowing duration) and a time T2 for the droplet to fall in the air (a dripping duration), and ensure that a speed of the droplet hit (the dripping speed $v_0$ when the droplet just hits the substrate) and a volume of the droplet (a droplet volume $V_0$) meet a requirement of $W_e > 100$. In this method, it is recommended that the falling height is to be greater than 11.8 cm, and the radius of the needle tube (the maximum radius ($R_n$) of the tip) is to be between 0.5 mm and 1 mm.

Figure 8:
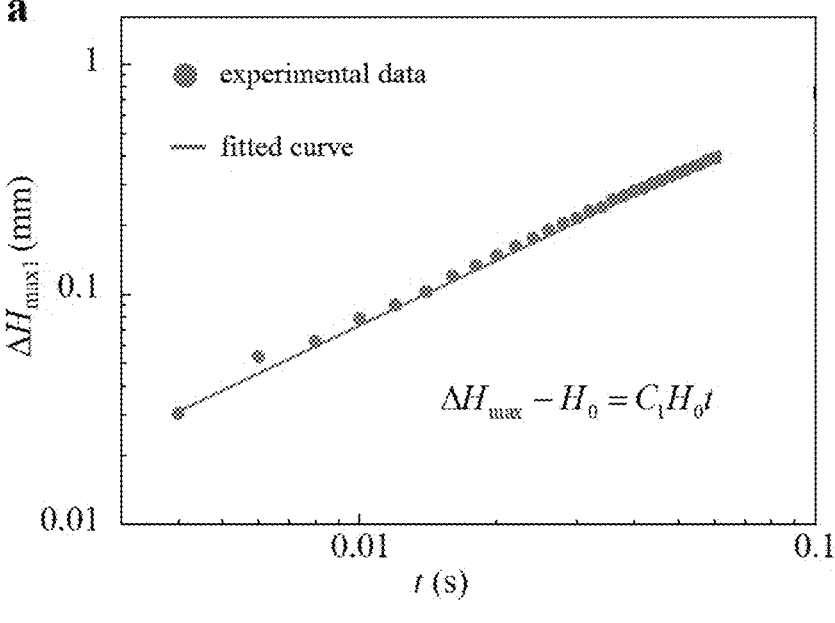
FIG. 8 is a schematic diagram of obtaining a first calculation coefficient by linearly fitting experimental data provided in an embodiment of the present disclosure.

(2) Combined with FIG. 8, after the droplet hits the substrate, the change of the height of the tip of the droplet with time is recorded, and a slope ($C_1$) is obtained by linear fitting experimental data.

(3) The calculated viscosity ($\eta$) is calculated by the formula $$\eta = C_1 \frac{\rho R_n^2}{H_0}.$$

(4) In order to obtain the surface tension of the liquid after a duration of T, it is necessary to calculate a time T1 for the droplet to flow in the needle tube and a time T2 for the droplet to fall in the air, and ensure that a speed of the droplet hit and a radius of the needle tube meet a requirement of $W_e < 100$. In this method, it is recommended that the falling height is to be less than 8 cm, and the radius of needle tube is to be between 0.5 mm and 1 mm.

(5) Combined with FIG. 9, after the droplet hits the substrate, the change of height of the tip of the droplet with time is recorded, and a curve of $\Delta H_{max}^3$ vs. t is drawn, and a slope ($C_2$) is obtained by linear fitting the experimental data.

(6) The surface tension coefficient ($\gamma$) is calculated by the formula $$\gamma = \frac{\eta C_2}{R_n^2}.$$

Combined with FIGS. 10 and 11, an apparatus for observing a droplet provided in a second aspect of embodiments of the present disclosure will be described below.

Figure 10:
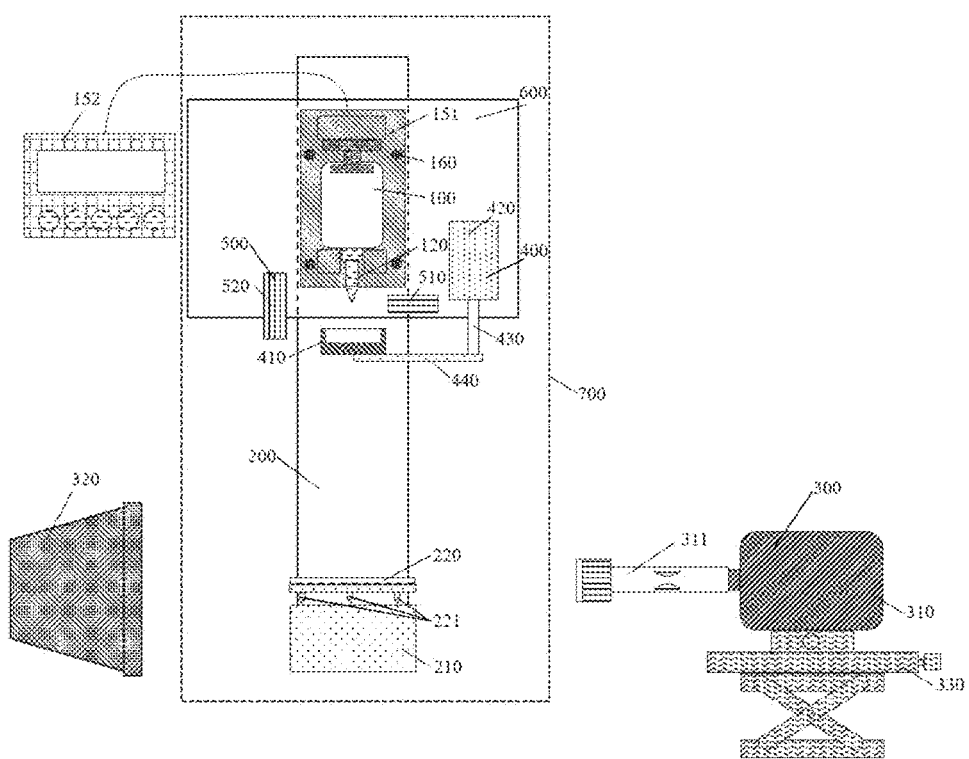
FIG. 10 is a schematic diagram for observing a droplet provided in an embodiment of the present disclosure.

Combined with FIG. 10, an apparatus for observing a droplet provided in an embodiment of the present disclosure includes a droplet injection component 100, a supporting component 200, and an acquisition component 300. The droplet injection component 100 is configured to generate the droplet, and the droplet injection component 100 includes a first light source emitter 110. A dripping direction of the droplet is the same as a light emitting direction of first light emitted by the first light source emitter 110. One end of the supporting component 200 is connected with the droplet injection component 100, and the other end of the supporting component 200 is connected with a stage 210. The stage 210 is configured to support a light spot sensor 220. The acquisition component 300 is configured to acquire an image of the droplet dripping on the light spot sensor. The acquisition component 300 is communicatively connected with the light spot sensor 200. The acquisition component 300 is controlled to move to an acquisition position matching a position signal, based on the position signal of the first light received by the light spot sensor 220.

In the apparatus for observing the droplet provided in the embodiment of the present disclosure, the droplet injection component 100 is configured to generate the droplet, and the droplet injection assembly is provided with the first light source emitter 110. The light emitting direction of the first light emitted by the first light source emitter 110 is the dripping direction of the droplet, so that it is possible to accurately locate a dripping path of the droplet and dripping on a predetermined position of the light spot sensor 220, and to ensure that the droplet may be accurately dripped on the predetermined position. At the same time, the light spot sensor 220 is communicatively connected with the acquisition component 300, the first light is irradiated on the light spot sensor 220, the light spot sensor 220 receives the position signal from the first light, and the acquisition component 300 moves to the acquisition position matching the position signal. The acquisition position is the predetermined position where the droplet drips. Therefore, the acquisition component 300 may accurately locate the acquisition position and acquire an image of the whole process of the droplet dripping on the light spot sensor 220.

In some other embodiments, the apparatus for observing the droplet further includes a mobile platform 600, through which the droplet injection component 100 is connected with the supporting component 200. The mobile platform 600 is capable of moving in a direction of the height of the supporting component 200 to adjust a distance between the droplet injection component 100 and the light spot sensor 220, so as to adjust a height at which the droplet is dripped to meet experiments with different requirements on the height at which the droplet is dripped.

The droplet injection component 100 includes a droplet nozzle 120, and a liquid adding assembly 130. An outlet 131 of the liquid adding assembly 130 faces a liquid inlet 1212 at one end of a droplet nozzle 120. The other end of the droplet nozzle 120 is provided with an injection port 1222. The first light source emitter 110 is connected with the droplet nozzle 120 and coaxially arranged with the injection port 1222, so that the first light is emitted from the injection port 1222. It may be understood that the droplet is ejected from the injection port 1222 and drips, and the light emitting direction of the first light source emitter 110 passes through the injection port 1222 and be ejected from the injection port 1222 to form a light path, and the dripping direction of the droplet is the same as the light emitting direction of the first light emitted by the first light source emitter 110. That is, the droplet may move along the light path of the first light source. By indicating a dripping point of the droplet through the light emitting direction of the first light source emitter 110, not only a dripping point at which the droplet is ejected may be observed in real time, but also a landing position of the droplet may be accurately located, so that an ejection path and a dripping point of the droplet may be monitored and adjusted in time.

By a coaxial arrangement, an accurate alignment between the first light and a position of the injection port 1222 is ensured, blocking of the first light by an inner wall of the droplet nozzle 120 is avoided, it is helpful to accurately control the light emitting direction of the first light to pass through the injection port 1222, and it is ensured that the first light is irradiated along a required path.

In some embodiments, the light spot sensor 220 is connected with a protective layer, which is connected above the light spot sensor 220. The protective layer is a layer body with a light transmitting structure. The protective layer may not only protect the light spot sensor 220 to prevent the reaction droplet from polluting the light spot sensor 220, but also enable the first light to pass through and irradiate on the light spot sensor 220, thus ensuring the normal use of the light spot sensor 220.

The protective layer may be glass, quartz, and may also be a light transmitting film structure. The protective layer may be selected according to actual needs.

A structure of the droplet nozzle 120 is described below in conjunction with FIG. 11.

Figure 11:
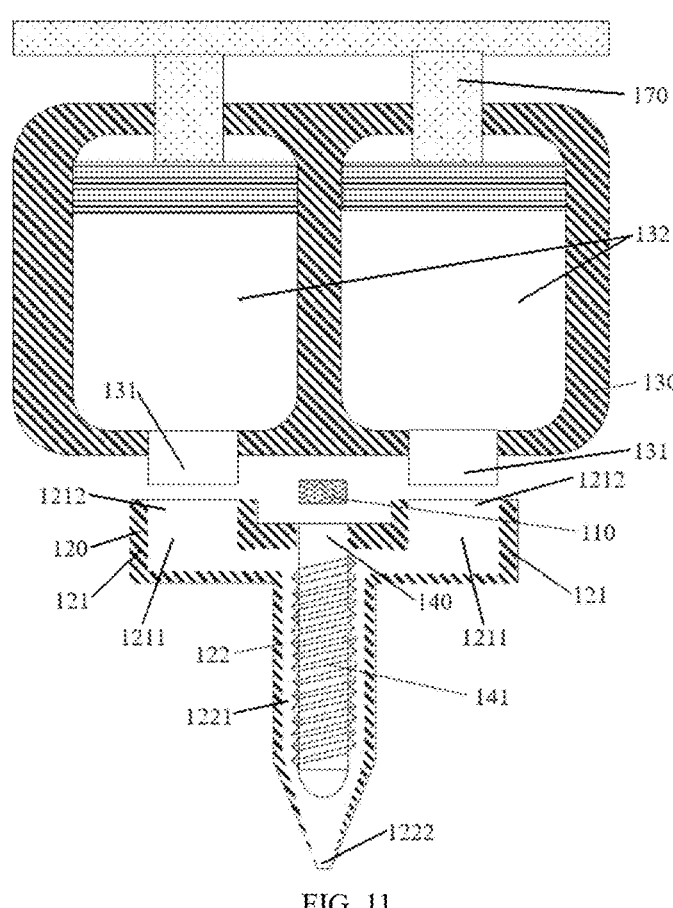
FIG. 11 is a schematic diagram of a droplet injection component provided in an embodiment of the present disclosure.

Referring to FIG. 11, the droplet nozzle 120 includes a liquid intake portion 121, an injection portion 122, and a stirring rod 140. The liquid intake portion 121 forms a liquid intake channel 1211, and one end of the liquid intake channel 1211 is provided with the liquid inlet. The injection portion 122 forms an injection channel 1221, the injection portion 122 is connected with the liquid intake portion 121, the injection channel 1221 is communicated with the other end of the liquid intake channel 1211, and an end of the injection channel 1221 far away from the liquid intake channel 1211 is provided with an injection port 1222. The stirring rod 140 is inserted into the injection channel 1221. The stirring rod 140 is coaxially arranged with the injection channel 1221. The stirring rod 140 is connected with the first light source emitter 110. An end of the stirring rod 140 faces the injection port 1222. The stirring rod 140 includes a rod body with a light transmitting structure.

In an embodiment of the present disclosure, the stirring rod 140 is arranged in the droplet nozzle 120, and the stirring rod 140 is inserted into the injection channel 1221, so that a liquid in the droplet nozzle 120 may be stirred. When the liquid is a high viscosity, non-Newtonian fluid, or a reaction liquid, its fluidity may be improved by the stirring of stirring rod 140, and the liquid flow is stable, so that the stability of droplet dripping from the injection port 1222 may be ensured, and the clogging of the droplet nozzle 120 may be avoided.

It is to be noted that the reaction liquid (which may also be understood as a reaction droplet) may be understood as a liquid (a droplet) chemically reacts on its own or with surroundings, such as an epoxy resin, 502 glue, etc.

Combined with FIG. 10, the first light source emitter 110 is disposed at one end of the stirring rod 140, and at the same time, the first light source emitter 110 is disposed at an outer side of the injection portion 122, which may prevent the liquid from entering the first light source emitter 110 and affecting the first light source emitter 110. The stirring rod 140 includes a rod body with a light transmitting structure, which may ensure that light from the first light source emitter 110 passes through a transmission shaft and reduce the light from being blocked by the stirring rod 140, thus improving the positioning accuracy.

Of course, the first light source emitter 110 may also be disposed inside the stirring rod 140. At this time, the stirring rod 140 is a light transmitting structure, and a cavity for installing the first light source emitter 110 is formed inside the stirring rod 140, thus saving additional installation space for the first light source emitter 110, having a compact structure and saving volume. The first light source emitter 110 may also be disposed at a bottom of the stirring rod 140, and the first light source emitter 110 is hermetically connected with the stirring rod 140 through a connector to avoid interference caused by a liquid entering the first light source emitter 110. The setting of the first light source emitter 110 may be set according to actual requirements, which is not limited here. The first light source emitter 110 is connected with the stirring rod 140, which may reduce the interference of external environmental factors on light and improve the stability and repeatability of the experiment. At the same time, the light emitting direction of the first light of the first light source emitter 110 passes through the stirring rod 140. That is, in the embodiment of the present disclosure an optical path is integrated into the stirring rod 140, which may reduce the complexity of the light path of the first light, reduce light loss, improve the transmission efficiency of the first light, and improve the positioning effect of dripping the droplet.

The liquid adding assembly 130 is provided with a plurality of liquid adding cavities 132, the droplet nozzle 120 is provided with a plurality of liquid inlets 1212, and the liquid adding cavities 132 and the liquid inlets 1212 are in one-to-one correspondence. The droplet nozzle 120 is provided with the plurality of liquid inlets 1212, that is, a plurality of liquid intake channels 1211 are provided, and the plurality of liquid intake channels 1211 communicate with the injection channel 1221. When liquid components in the plurality of liquid intake channels 1211 are different, that is, a liquid in the injection channel 1221 is a synthetic liquid mixed by a plurality of liquids with different components, a stirring paddle is inserted in the injection channel 1221, so that the liquids with different components may be fully mixed, and the quality of the synthetic liquid in the injection channel 1221 may be improved. For example, for some special resins or synthetic solvents, it is feasible to place the liquids (such as resins, hardeners, diluents and other liquids) with different components required therein in the plurality of liquid intake channels 1211. After being mixed by sufficient stirring of the stirring rod 140, the liquids with different components enter the injection channel 1221. In a mixing process, the plurality of liquids with different components chemically react to form special resins or synthetic solvents.

The liquid adding cavities 132 and the liquid inlets 1212 are in one-to-one correspondence, which may effectively prevent cross-contamination between the liquids with different components and maintain the purity of a sample and the accuracy of an experiment.

It is to be noted that, when a liquid nozzle includes the plurality of liquid intake channels 1211, liquid components in the plurality of liquid intake channels 1211 may be different, may be the same, or may be partially the same or partially different, and the liquid components in the plurality of liquid intake channels 1211 may be selected according to actual needs.

Combined with FIG. 10, an outer wall of the stirring rod 140 is provided with a guide groove 141, and the guide groove 141 is wound around the stirring rod 140 with a plurality of circles. When the liquid flows from the liquid intake channel 1211 to the injection channel 1221, the droplet flow along the guide groove 141, so that the stirring rod 140 may stir the liquid. The droplet nozzle 120 is provided with the plurality of liquid intake channels 1211. When the liquid components in the liquid intake channels 1211 are different, the plurality of liquids with different components flow along the guide groove 141 and are mixed at the same time, thus realizing the generation of synthetic liquid in the injection channels 1221. At the same time, the guide groove 141 is wound around the stirring rod 140 with the plurality of circles, which makes the stirring and mixing more uniform and helps to ensure the uniformity of a reaction or mixing process. The synthesis of the reaction liquid may be realized while the liquid flows to the injection port 1222, and it is not necessary to wait for the liquid to be synthesized before entering the droplet nozzle 120, thus saving the experimental time and improving the experimental efficiency.

The droplet nozzle 120 is provided with the plurality of liquid inlets 1212, that is, the plurality of liquid intake channels 1211 are provided, and the plurality of liquid intake channels 1211 communicate with the injection channels 1221. The liquid components in the plurality of liquid intake channels 1211 may be different, may be the same, or may be partially the same or partially different, and the liquid components in the plurality of liquid intake channels 1211 may be selected according to actual needs.

The stirring rod 140 may be a threaded rod, and the guide groove 141 may be a thread. The stirring rod 140 has a simple structure and may effectively stir and mix the liquid. By adjusting a size, spacing and winding number of the threads, that is, by adjusting a size, spacing and winding number of the guide grooves 141, the speed and degree of liquid stirring and mixing may be adjusted, and the guide grooves 141 may be arranged according to the actual situation.

In some other embodiments, a baffle is arranged in the liquid intake channel 1211, one end of the baffle is connected with the liquid intake portion 121, and the other end of the baffle is inclined downward, which may effectively prevent the liquid from countercurrent, and the other end of the baffle and an inner wall of the liquid intake portion 121 form a liquid inlet. The baffle may not only prevent the liquid from countercurrent, but also ensure that the liquid may enter from the liquid inlet, effectively ensuring the input of the liquid, thus ensuring the stability of the liquid flow.

The apparatus for observing the droplet further includes a blocking component 400. The blocking component 400 is connected with the supporting component 200, a liquid bearing tray 410 of the blocking component 400 may move between an initial position for avoiding the first light and a shielding position for shielding the first light. When the liquid bearing tray 410 is in the initial position, the liquid bearing tray 410 avoids the first light. At this time, the liquid bearing tray 410 avoids the droplet, and the droplet drips on the light spot sensor 220 along the light emitting direction of the first light without obstruction. When the liquid bearing tray 410 is located in the shielding position, it may be understood that the liquid bearing tray 410 is located between the first light source emitter 110 and the light spot sensor 220, and the liquid bearing tray 410 shields the first light. At this time, the first light irradiates on the liquid bearing tray 410, but the first light does not irradiate on the light spot sensor 220, and the droplet may drip on the liquid bearing tray 410, thus preventing subsequent droplets from dripping on the light spot sensor 220 and affecting a collision experiment of previous droplets on the light spot sensor 220.

The apparatus for observing the droplet further includes a trigger component 500. The trigger component 500 is communicatively connected with the blocking component 400. The trigger component 500 is configured to control the liquid bearing tray 410 to switch from the initial position to the shielding position, based on the trigger component 500 receiving a trigger signal for the droplet to pass through for a set number of times. It may be understood that once a droplet has dripped, the trigger signal of the trigger component 500 is triggered, and each time the trigger component 500 triggers the signal, it is assumed that the droplet drips once. When the number of droplets dripping reaches the set number of times, the liquid bearing tray 410 is controlled to switch from the initial position to the shielding position to avoid the influence of subsequent droplets on previous droplets.

Once is taken as an example of the set number of times. When a droplet drips once (assuming that a droplet dripping is a droplet A at this time), the trigger component 500 is triggered once, and the trigger component 500 generates a trigger signal once, Then, the liquid bearing tray 410 is controlled to switch from the initial position to the shielding position. At this time, the droplet A has passed the shielding position of the liquid bearing tray 410, and the droplet A will continue to move downward until it drips on the light spot sensor 220. At the same time, the liquid bearing tray 410 moves to the shielding position, which may prevent the subsequent droplets from dripping on the light spot sensor 220 and affecting the droplet A.

Of course, the set number of times is not limited to once, but may be twice, that is, the droplet passes through the trigger component 500 twice. Then, the liquid bearing tray 410 is controlled to switch from the initial position to the shielding position. The set number of times may also be three times, four times, etc., and the set number of times may be selected according to actual needs.

The trigger component 500 includes a second light source emitter 510 and a light intensity receptor 520. The light intensity receptor 520 is configured to receive an optical signal of second light emitted by the second light source emitter 510, the second light source emitter 510 and the light intensity receptor 520 are respectively arranged at two sides of the first light, and a light emitting direction of the second light source emitter 510 intersects with a light emitting direction of the first light source emitter 110. The light intensity receptor 520 is configured to receive the optical signal of the second light emitted by the second light source emitter 510, and the trigger signal is outputted when the optical signal changes. As the droplet drips through the second light, an area of the droplet shielding the second light changes from small to large and then to small. Correspondingly, a light intensity on a surface of the light intensity receptor 520 (that is, the light signal of the second light) changes from strong to weak and then to strong. At this time, the light intensity receptor 520 sends out a trigger signal. When receiving a weak light signal, the light intensity receptor 520 sends out a trigger signal. It may be understood that the dripping direction of the droplet is the same as the light emitting direction of the first light source emitter 110, and the light emitting direction of the second light source emitter 510 intersects with the light emitting direction of the first light source emitter 110. The positioning of the droplet and the trigger component 500 is simple, and a moving path of the droplet dripping may be accurately positioned before starting an experiment, so as to ensure that the droplet passes through the second light, thus ensuring that the trigger component 500 may accurately detect the number of the droplet passing through, and ensuring the experimental effect.

The blocking component 400 further includes a rotating console 420. A driving device is arranged in a shell of the rotating console 420, an output shaft 430 of the driving device is connected with the liquid bearing tray 410 through a cantilever 440, and the output shaft 430 rotates to drive the liquid bearing tray 410 to rotate between the initial position and the shielding position. It may be understood that the trigger component 500 is communicatively connected with the rotating console 420. When the droplet passes through the set number of times, the trigger component 500 sends the trigger signal to the rotating console 420. After receiving the trigger signal, the rotating console 420 controls the output shaft 430 of the driving device to rotate, thus driving the cantilever 440 connected with the output shaft 430 to rotate. The cantilever 440 is connected to the liquid bearing tray 410, thus driving the liquid bearing tray 410 to rotate from the initial position to the shielding position. Of course, when the droplet is needed for experiments, the rotating console 420 controls to drive the rotation of the output shaft 430 to rotate the cantilever 440, which in turn rotates the liquid bearing tray 410 from the shielding position to the initial position. The blocking component 400 has a simple structure, and the rotating console 420 may accurately control the position of the liquid bearing tray 410, so that it may rotate accurately between the initial position and the shielding position, which is helpful to ensure the avoidance and shielding of the first light. At the same time, the driving device is arranged in the shell of the rotating console 420, which may not only save additional installation space for the driving device and a structure of the blocking component is compact, but also may avoid the influence of external environmental factors on the driving device.

In some embodiments, the apparatus for observing the droplet further includes the mobile platform 600, and the blocking component 400 is connected with the supporting component 200 through the mobile platform 600. When the mobile platform 600 moves in a direction of the height of the supporting component 200, it may drive the blocking component 400 to move, thus adjusting a height position of the blocking component 400.

When the apparatus for observing the droplet further includes the mobile platform 600, it is also possible that both the droplet injection component 100 and the blocking component 400 are connected to the supporting component 200 through the mobile platform 600, and the mobile platform 600 moves in a direction of the height of the supporting component 200, so that the droplet injection component 100 and the blocking component 400 move synchronously.

The acquisition component 300 includes a high-speed camera 310, and a third light source emitter 320 configured for providing a background light source for the high-speed camera 310. The high-speed camera 310 and the third light source emitter 320 are respectively arranged at two sides of the stage 210. A bottom of the high-speed camera 310 is connected with a three-axis displacement table 330, and the three-axis displacement table 330 is communicatively connected with the light spot sensor 220. The three-axis displacement table 330 is configured to adjust a position of the high-speed camera 310 in a horizontal transverse direction, a horizontal longitudinal direction, and a vertical direction, so that the high-speed camera 310 is aligned with the acquisition position. The three-axis displacement table 330 is communicatively connected with the light spot sensor 220. When the light spot sensor 220 receives the light signal irradiated by the first light, the light spot sensor 220 may locate a light spot position (that is, a predetermined position at which the droplet drips) irradiated by the first light and send the position signal to the three-axis displacement table 330. The three-axis displacement table 330 controls the high-speed camera 310 to finely adjust and move in the horizontal transverse direction, the horizontal longitudinal direction, and the vertical direction, so as to enable the high-speed camera 310 to move to the acquisition position aligned with the light spot position. That is, the three-axis displacement table 330 may drive the high-speed camera 310 to adjust its position in a front and rear, up and down, and left and right directions. The high-speed camera 310 may be adjusted in real time according to a position at which the droplet drips, which effectively improves the experimental flexibility and efficiency, may accurately align the light spot position, and improve the accuracy of droplet image acquisition.

The third light source emitter 320 is configured for providing the background light source for the high-speed camera 310. The background light source may reduce shadows and improve the visibility of the droplet, effectively improve the quality and clarity of liquid images, and help to capture images better.

A plurality of adjustment columns 221 are rotatably connected to the bottom of the light spot sensor 220. The plurality of adjustment columns 221 are configured to adjust an included angle between the light spot sensor 220 and a surface of the stage 210. It may be understood that the stage 210 is configured to place the light spot sensor 220. A horizontal plane is taken as an example of the surface of the stage 210. The plurality of adjustment columns 221 are configured to support the light spot sensor 220, which may adjust the included angle between the light spot sensor 220 and the surface of the stage 210, that is, the included angle between the light spot sensor 220 and the horizontal plane, so as to meet angle requirements of different experiments for the droplet colliding with the light spot sensor 220 at different angles and meet experimental requirements under different conditions. Further, it is no need to replace or reinstall the light spot sensor 220.

Of course, the included angle may be 0 degrees, when the surface of the light spot sensor 220 is a horizontal plane. The included angle may also be greater than 0 degrees and less than 90 degrees, and the included angle may be selected according to actual needs.

Combined with FIG. 10, an apparatus for observing a droplet provided in an embodiment of the present disclosure is described below.

As shown in FIG. 10, a test platform (an apparatus for observing a droplet) is set up. The apparatus for observing the droplet mainly includes four parts, a droplet injection component 100, a blocking component 400, an acquisition component 300, and a supporting component 200.

The droplet injection component 100 includes a single channel injection pump 151, an injection pump controller 152, a syringe (a liquid adding assembly 130), a needle (a droplet nozzle 120) and a z-axis electric displacement table (a mobile platform 600). The injection pump 151 is integrally fixed on the mobile platform 600 by a bolt 160, and an injector needs to be installed on the injection pump 151.

A specific structure of the injector is shown in FIG. 11. The syringe includes a needle with a light transmitting screw (a stirring rod 140), a light source device above the screw (a first light source emitter 110), a double chamber syringe (a chamber being a liquid adding chamber 132), and a push rod 170.

One end of the light transmitting screw in contact with the light source device is flat, and the other end is a spherical crown, so that light emitted by the light source device passes through the light transmitting screw, and is emitted from a tip of the needle after converging through the spherical crown. A light spot is formed on the light spot sensor 220.

When two different liquids are needed to synthesize a droplet, A and B chambers of the syringe are filled with liquids with different components, respectively. In case that the droplet is a single component, liquids in the A and B chambers are the same. The injection pump 151 squeezes the push rod 170 to push the liquid in the chamber into the tip of the needle and mix it through the light transmitting screw.

A specific design of the blocking component 400 is shown in FIG. 10. The blocking component 400 includes a laser (a second light source emitter 510), a light intensity receptor 520, a rotating console 420, a cantilever 440, and a liquid bearing tray 410.

The blocking component 400 and the injection pump 151 are fixed on the mobile platform 600, and the liquid bearing tray 410 is located below a needle tip. Laser emitted by the laser falls on the light intensity receptor 520, and a light path of the laser intersects with light emit from the tip of the needle tip.

The light intensity receptor 520 is connected with the rotating console 420 as a trigger. An excitation signal is outputted when a light intensity on a surface of the light intensity receptor 520 changes sharply. In an initial state, the laser is irradiated on the light intensity receptor 520, and the light intensity receptor 520 has no light intensity change. The liquid bearing tray 410 and the needle are kept at a distance (at this time, the liquid bearing tray 410 being in an initial position to avoid a light emitting direction of first light), that is, the liquid bearing tray 410 does not affect the light emitted from the needle to irradiate the light spot sensor 220.

When a droplet is generated and falls at the needle, the light intensity on the surface of the light intensity receptor 520 changes from strong to weak and then to strong. At this time, the light intensity receptor 520 sends out a trigger signal. After the rotating console 420 is triggered, a transmission shaft is controlled to rotate at a certain angle, and the liquid bearing tray 410 is driven by the cantilever 440, so that the liquid bearing tray 410 rotates directly below the needle, that is, a vertical projection of the tip of the needle falls into a tray to prevent subsequent droplets from dripping onto the light spot sensor 220.

The other end of the supporting component 200 is connected with the stage 210. The stage 210 is configured to support the light spot sensor 220 covered with a light transmitting material (such as glass). The light spot sensor 220 may determine a position of a spot of the first light falling on the surface (a position signal of the first light received by the light spot sensor 220) and send a signal to the three-axis displacement table 330.

A high-speed camera mechanism (an acquisition component 300) consists of a high-speed camera 310, a zoom lens 311, a three-axis displacement table 330, and a strong light source (a third light source emitter 320). The high-speed camera 310 starts to record images after receiving a signal from the light intensity receptor 520. After receiving a signal from the light spot sensor 220, the three-axis displacement table 330 starts to work, and moves a focal plane of the camera to a position where a light spot is located (that is, controlling the acquisition component 300 to move to the acquisition position matching the position signal).

The droplet injection component 100 (excluding the injection pump controller 152), the blocking component 400, the stage 210 and the light spot sensor 220 are all placed in a transparent box 700 to prevent interference of airflow in the air on an observation process.

A measurement flow of the apparatus for observing the droplet in the embodiment of the present disclosure is described below.

(1) A liquid to be tested is put into a syringe, and the first light source emitter 110 on the droplet nozzle 120 is turned on, so that the first light emitted by the first light source emitter 110 irradiates on the light spot sensor.

(2) The second light source emitter 510 is turned on, and the second light emitted by the second light source emitter 510 is projected onto the light intensity receptor 520, at this time, the position of the liquid bearing tray 410 is in the initial position.

(3) The mobile platform 600 is adjusted, so that a distance between the injection port 1222 of the droplet nozzle 120 and the light spot sensor 220 reaches a specified height. The surface of the light spot sensor 220 is covered with a light transmitting layer. The light transmitting layer may be glass. It may also be understood that the mobile platform 600 is adjusted, so that a distance between the injection port 1222 of the droplet nozzle 120 and a glass substrate (a glass light transmitting layer) reaches a specified height.

(4) The light spot sensor 220, the third light source emitter 320, the high-speed camera 310, and the three-axis displacement table 330 are started, and the high-speed camera 310 is moved to the acquisition position according to a spot position on the light spot sensor 220 and focusing is completed.

(5) The injection pump 151 is started. The injection pump 151 squeezes the push rod 170 of the syringe to push out the liquid in the liquid adding cavity 132. The liquid enters the droplet nozzle 120 from the liquid inlet 1212. Finally, the droplet is generated at the injection port 1222 of the droplet nozzle 120 and dripped from the tip of the needle (i.e., the injection port 1222).

(6) When the droplet passes through the second light, the light intensity receptor 520 is triggered, the liquid bearing tray 410 rotates from the initial position to the shielding position, and the high-speed camera 310 starts to acquire images.

In the method for measuring the liquid flow property provided in the present disclosure, the calculated viscosity of the droplet is determined based on the first calculation coefficient, the droplet density, the maximum radius of the tip and the initial height of the tip. The first calculation coefficient is the ratio of the tip height change value to the testing duration. The tip height of the droplet may change with the testing duration. The present disclosure is capable of measuring the calculated viscosity of the droplet according to a change of the height of the tip of the droplet with time, which is obviously different from the existing titration method, rotation method, vibration method and pipeline method. The method for measuring the liquid flow property may monitor a change of the droplet in real time, so that a dynamic change of a droplet flow property may be captured.

In the apparatus for observing the droplet provided in the embodiment of the present disclosure, the droplet injection component is configured to generate the droplet, and the droplet injection assembly is provided with the first light source emitter. The light emitting direction of the first light emitted by the first light source emitter is the dripping direction of the droplet, so that it is possible to accurately locate a dripping path of the droplet and dripping on a predetermined position of the light spot sensor, and to ensure that the droplet may be accurately dripped on the predetermined position. At the same time, the light spot sensor is communicatively connected with the acquisition component, the first light is irradiated on the light spot sensor, the light spot sensor receives the position signal from the first light, and the acquisition component moves to the acquisition position matching the position signal. The acquisition position is the predetermined position where the droplet drips. Therefore, the acquisition component may accurately locate the acquisition position and acquire an image of the whole process of the droplet dripping on the light spot sensor.

Finally, it is to be noted that the above embodiments are merely used to illustrate the technical solution of the present disclosure, but not to limit it. Although the present disclosure has been described in detail with reference to the above-mentioned embodiments, those skilled in the art should understand that it is still possible to modify the technical solutions described in the above-mentioned embodiments, or to replace some technical features with equivalents. However, these modifications or substitutions do not make the essence of the corresponding technical solutions depart from the spirit and scope of the technical solutions of various embodiments of the present disclosure.

What is claimed is:

1. A method for measuring a liquid flow property, comprising:

controlling a droplet to drop from a preset height to a substrate;

acquiring a droplet density on the substrate, a maximum radius of a tip of the droplet, a real-time height of the tip, an initial height of the tip, and a testing duration from a beginning of the droplet to fall on the substrate to an end of a test;

determining that influencing factors of the tip of the droplet comprise inertial force and viscous force, and the inertial force is equal to the viscous force, and calculating a calculated viscosity of the droplet, wherein the calculated viscosity of the droplet is related to a first calculation coefficient, the droplet density, the maximum radius of the tip and the initial height of the tip, and the first calculation coefficient is equal to a ratio of a tip height change value to the testing duration, wherein the tip height change value is a difference between the initial height of the tip and the real-time height of the tip.

2. The method for measuring the liquid flow property of claim 1, wherein before calculating the calculated viscosity of the droplet, controlling a Weber number of the droplet to be greater than or equal to a set threshold; and determining that influencing factors of the tip of the droplet comprise inertial force and viscous force, and the inertial force is equal to the viscous force, based on the Weber number being greater than or equal to the set threshold.

3. The method for measuring the liquid flow property of claim 2, wherein a calculation formula for determining the calculated viscosity of the droplet based on the inertial force being equal to the viscous force is:

$$\rho \frac{\partial^2 H_{max}}{\partial t^2} R_n^2 H_{max} = \eta \frac{\partial H_{max}}{R_n \partial t} R_n H_{max} \tag{1}$$

where $\rho$ is the droplet density;

$\rho$ is the calculated viscosity;

$R_n$ is the maximum radius of the tip;

t is the testing duration from the beginning of the droplet to fall on the substrate to the end of the test;

$H_{max}$ is the real-time height of the tip, which varies with the testing duration t;

obtaining a formula:

$$\frac{\Delta H_{max}}{H_0} = \frac{\eta t}{\rho R_n^2} \tag{2}$$

by solving the formula (1),
obtaining:

$$\eta = C_1 \frac{\rho R_n^2}{H_0}$$

by the formula (2);

where $\Delta H_{max}$ is the tip height change value, and $\Delta H_{max} = H_0 - H_{max}$;

$H_0$ is the initial height of the tip when the droplet drips on the substrate;

$C_1$ is the first calculation coefficient, where $$C_1 = \frac{\Delta H_{max}}{t}.$$

4. The method for measuring the liquid flow property of claim 2, wherein the preset height is greater than or equal to 11.8 cm, and the maximum radius of the tip is between 0.5 mm to 1 mm.

5. The method for measuring the liquid flow property of claim 1, further comprising:

controlling a Weber number of the droplet to be less than a set threshold;

determining that influencing factors of the tip comprise viscous force and surface tension, and the viscous force is equal to the surface tension, based on the Weber number being less than the set threshold;

after the step of calculating the calculated viscosity of the droplet, determining a ratio of a third power of the tip height change value to the testing duration as a second calculation coefficient, based on the viscous force being equal to the surface tension, calculating a surface tension coefficient of the surface tension from the calculated viscosity, the second calculation coefficient, and the maximum radius of the tip.

6. The method for measuring the liquid flow property of claim 5, wherein a calculation formula for calculating the surface tension coefficient of the surface tension from the calculated viscosity, the second calculation coefficient, and the maximum radius of the tip, based on the viscous force being equal to the surface tension is:

$$\left(\frac{\Delta H_{max}}{R_n}\right)\eta\frac{\Delta H_{max}}{t}\Delta H_{max} = \gamma R_n \qquad (3)$$

where $\Delta H_{max}$ is the tip height change value, and $\Delta H_{max} = H_0 - H_{max}$; $H_0$ is the initial height of the tip when the droplet drips on the substrate; $H_{max}$ is the real-time height of the tip, which varies with the testing duration t;

$R_n$ is the maximum radius of the tip;

$\eta$ is the calculated viscosity;

t is the testing duration from the beginning of the droplet to fall on the substrate to the end of the test;

the surface tension is $F = \gamma R_n$;

$\gamma$ is the surface tension coefficient, which represents surface tension on a straight line segment of a unit length on a liquid surface;

obtaining a formula:

$$\Delta H_{max} = \sqrt[3]{\frac{\gamma R_n^2 t}{\eta}} \qquad (4)$$

by solving the formula (3),
obtaining $$\gamma = \frac{\eta C_2}{R_n^2}$$

by the formula (4);

where $C_2$ is the second calculation coefficient, where $$C_2 = \frac{\Delta H_{max}^3}{t}.$$

7. The method for measuring the liquid flow property of claim 5, wherein the preset height is less than 8 cm, and the maximum radius of the tip is between 0.5 mm to 1 mm.

8. The method for measuring the liquid flow property of claim 7, wherein a calculation formula of the Weber number is:

$$W_e = \frac{\rho v_0^2}{\gamma}\left(\frac{3V_0}{4\pi}\right)^{\frac{1}{3}}$$

where $W_e$ is the Weber number;

$\rho$ is the droplet density;

$v_0$ is a dripping speed of the droplet when it just drips on the substrate;

$V_0$ is a droplet volume;

$\gamma$ is the surface tension coefficient, which represents the surface tension on the straight line segment of the unit length on the liquid surface;

acquiring the dripping speed $v_0$ and the droplet volume $V_0$ when the droplet just drips on the substrate, and adjusting a numerical range of the Weber number by controlling the dripping speed $v_0$ and the droplet volume $V_0$.

9. The method for measuring the liquid flow property of claim 1, wherein controlling the droplet to drop from the preset height to the substrate further comprises:

acquiring a flowing duration of the droplet flowing in a container; wherein the container is configured to contain a liquid, and the liquid forms the droplet at an opening of the container;

acquiring a dripping duration from the beginning of the droplet to fall on the substrate;

determining that a sum of the flowing duration, the dripping duration and the testing duration is a total duration, and the testing duration is far less than the total duration.

10. The method for measuring the liquid flow property of claim 1, wherein determining the ratio of the tip height change value to the testing duration as the first calculation coefficient comprises:

acquiring the initial height of the tip and a plurality of the real-time heights of the tip within the testing duration, and obtaining a linear relationship between the first calculation coefficient, the testing duration and the tip height change value by fitting.

\* \* \* \* \*